United States Patent
Zhao et al.

(10) Patent No.: US 9,521,564 B2
(45) Date of Patent: Dec. 13, 2016

(54) WIRELESS AUTOMATION TEST APPARATUS AND METHOD FOR MOBILE DEVICE

(71) Applicant: BORQS WIRELESS LTD., Beijing (CN)

(72) Inventors: Hui Zhao, Beijing (CN); Jin Wu, Beijing (CN); Wei Ding, Beijing (CN)

(73) Assignee: BORQS WIRELESS LTD. (CN)

( * ) Notice: Subject to any disclaimer, the term of this patent is extended or adjusted under 35 U.S.C. 154(b) by 0 days.

(21) Appl. No.: 14/416,547

(22) PCT Filed: Nov. 2, 2012

(86) PCT No.: PCT/CN2012/083955
§ 371 (c)(1),
(2) Date: Jan. 22, 2015

(87) PCT Pub. No.: WO2014/015573
PCT Pub. Date: Jan. 30, 2014

(65) Prior Publication Data
US 2015/0181447 A1    Jun. 25, 2015

(30) Foreign Application Priority Data

Jul. 24, 2012  (CN) .......................... 2012 1 0256712

(51) Int. Cl.
*H04B 17/00*    (2015.01)
*H04W 24/06*    (2009.01)
(Continued)

(52) U.S. Cl.
CPC .......... *H04W 24/06* (2013.01); *G06F 11/2294* (2013.01); *G06F 11/3664* (2013.01)

(58) Field of Classification Search
CPC ...... H04W 24/06; H04W 24/08; H04W 24/00; H04W 88/02
(Continued)

(56) References Cited

U.S. PATENT DOCUMENTS 8,064,900 B2 * 11/2011 Topaltzas ............... H04W 24/06
                                                                370/241
2013/0078983 A1 * 3/2013 Doshi et al. .................. 455/418

FOREIGN PATENT DOCUMENTS

| CN | 101521899 | 11/2010 | ............ H04W 24/06 |
| CN | 102256285 | 11/2011 | ............ H04W 24/02 |

(Continued)

OTHER PUBLICATIONS

International Search Report issued in corresponding application No. PCT/CN2012/083955, dated Apr. 25, 2013 (6 pgs).

*Primary Examiner* — Nay A Maung
*Assistant Examiner* — Angelica M Perez
(74) *Attorney, Agent, or Firm* — Hayes Soloway PC

(57) ABSTRACT

A wireless automation test apparatus for a mobile device includes a user setting unit, a test management and control unit, a test execution unit, a test result processing unit, and a communication interface unit. Also provided is a test method involving downloading a test case as well as a configuration file and an index file corresponding to the test case from a server; receiving a user custom test operation mode, and operating the test case according to operation mode information; collecting a site log, collecting and packing a test result, and uploading the test result to the server; and finally, after the test result is analyzed by the server, showing the test result and an error log on a Web interface.

10 Claims, 1 Drawing Sheet

(51) Int. Cl.
*G06F 11/36* (2006.01)
*G06F 11/22* (2006.01)

(58) Field of Classification Search
USPC ... 455/67.11, 67.12, 67.16, 68, 69; 370/241, 370/247
See application file for complete search history.

(56) References Cited

FOREIGN PATENT DOCUMENTS

| | | | |
|---|---|---|---|
| CN | 202210277 | 5/2012 | |
| CN | 202210277 U * | 5/2012 | |
| WO | WO2007061241 | 5/2007 | .............. G06F 11/22 |

* cited by examiner

WIRELESS AUTOMATION TEST APPARATUS AND METHOD FOR MOBILE DEVICE

TECHNICAL FIELD

The present invention relates to a test apparatus and a method, in particular to a wireless automation test apparatus and method for mobile device.

BACKGROUND ART

Most existing automation test techniques in the mobile device field are implemented on the basis of user interface and screen capture snapshot. Thus, the device has to be operated via a debugging cable. In addition, most tests are local tests executed for specific functions on the basis of a specific technique, such as unit tests, performance tests, etc., and full automation test can't be implemented.

For the existing test methods, such as the Monkey Runner automation test on android devices, the operations have to be carried out by clicking on the specific coordinates on the user interface, and the test result is verified by comparing screenshots. Since the comparison consumes processor resource heavily, it can be handled timely only by a PC processor that serves as a host and appropriate tools. Consequently, an apparatus debugging cable must be always connected. Another automation test method is Instrumentation, which mainly starts the unit test or functional test of a specific application by means of command line but can't simulate the normal operation of application switchover as required by the user. Therefore, it can't fully implement continuous automation tests for all applications.

A drawback of existing test methods is: a full automation test can't be implemented. Here, a full automation test refers to an automation test that is configured with an independent library of classified test cases, without debugging cable and without manual intervention, in which the tests are executed automatically and continuously and the test results are collected and analyzed automatically.

SUMMARY OF THE INVENTION

Technical Problem

To overcome the drawback in the prior art, the object of the present invention is to provide a wireless automation test apparatus and method for mobile device, with which, a series of testing procedures, such as initialization of testing environment, test execution, and collection of test result, etc. can be accomplished without connection of a debugging cable to the tested device and a wireless automation test process can be achieved.

Solution to the Problem

Technical Scheme

To attain the object described above, the present invention provides a wireless automation test apparatus for mobile device, comprising: a user setting unit, a test management and control unit, a test execution unit, a test result processing unit, and a communication interface unit, wherein, the user setting unit is designed to receive a user-defined cycle count for the whole round of test, a test case schedule list, and a server IP for data synchronization;

the test management and control unit is designed to control the test operation of the test execution unit, control the test result processing unit to collect an on-site log and pack the test result, and control the communication interface unit to send/receive information;

the test execution unit accepts the control of the test management and control unit and executes the test cases without a debugging cable;

the test result processing unit accepts the control of the test management and control unit and analyzes the uploaded test result;

the communication interface unit is designed to transmit synchronous data between the test apparatus and a server.

Wherein, the test apparatus further comprises a display unit designed to display test process information and error information synchronously.

Wherein, the display unit is a display screen of a mobile device.

Wherein, the communication interface unit is a wireless communication interface module.

To attain the object described above, the present invention provides a wireless automation test method for mobile device, comprising the following steps:

1) downloading a test case as well as a configuration file and an index file corresponding to the test case from a server;
2) receiving a user-defined test operation mode and executing the test case according to the operation mode information;
3) collecting an on-site log, packing test result, and uploading the packed test result to the server;
4) presenting the test result and an error log on a Web interface after the test result is analyzed by the server.

Wherein, the step 1) further comprises the following steps:

a) user submitting a prepared test case, a configuration file and an index file created for the test case to the server;
b) obtaining a server IP for data synchronization;
c) downloading the test case as well as the configuration file and index file corresponding to the test case from the server.

Wherein, the operation mode information in step 2) is a cycle count for the whole round of test or a test case schedule list.

Wherein, the step 3) further comprises, in case an error occurs in the test case, immediately collecting and packing the test result and corresponding on-site log that involve the error, and uploading them to the server through a wireless network.

All modular units in the present invention are loosely coupled, are easy to extend, and have flexibility to adapt to change. Therefore, the maintenance cost can be reduced. When the internal structure or implementation of a module is changed gradually, all other modules are not affected; in that case, the test developing engineer only has to submit the developed test case program and configuration file to the server side; the server side collects and manage all test resources; the test case program is synchronized and executed, and the test result is packed and uploaded; the front-end Web interface presents a test report.

Since the method provided in the present invention is easy to operate, the test cost and the requirement for the skills of the tester are reduced. Hence, the user can complete the whole round of test process at anytime and anyplace, and can check a detailed and clear test report, whether the user is a technician or not. A test engineer can use the present invention flexibly, for example, a product bug in the test process can be reproduced conveniently in Human mode, such that the software engineer can handle the reproduced problem more quickly. Since the present invention supports different test cases, a test engineer can complete different tests according to the test requirements.

Hereunder other characteristics and advantages of the present invention will be described, and will become apparent partially according to the description or can be understood clearly by implementing the present invention.

BRIEF DESCRIPTION OF THE DRAWINGS

Description of the Drawings

Figure 1:
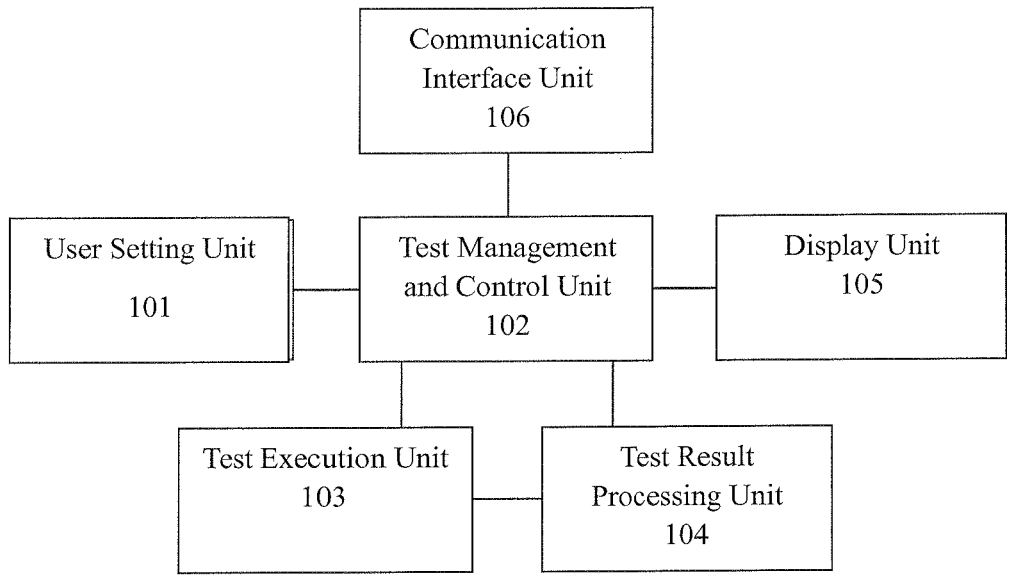
Figure 2:
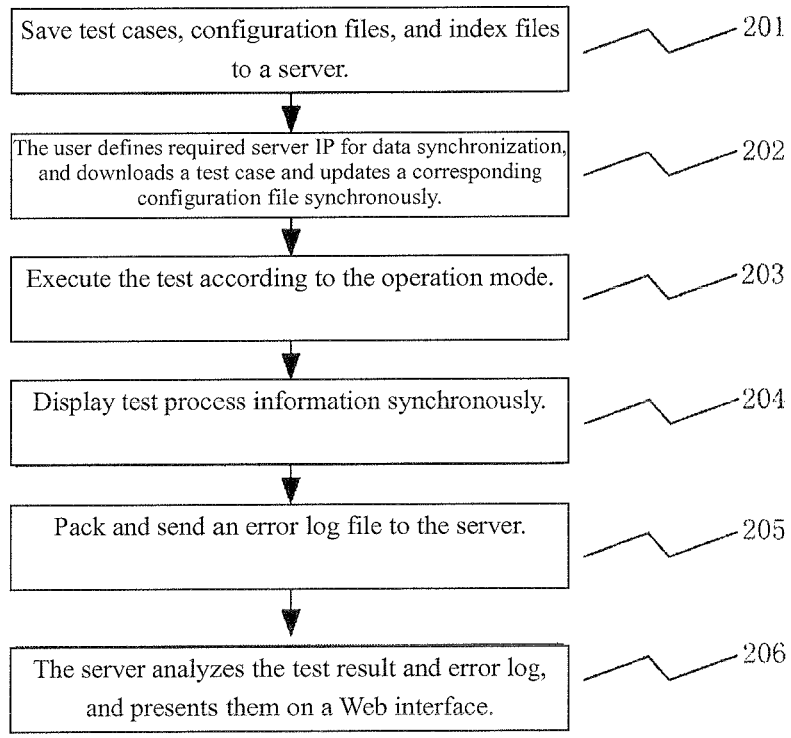

The accompanying drawings are provided for further understanding of the present invention, and constitute a part of the description. These drawings are used in conjunction with the embodiments to interpret the present invention, but don't constitute any limitation to the present invention. Among the drawings:

FIG. 1 is a functional block diagram of a wireless automation test apparatus for mobile device according to the present invention;

FIG. 2 is a flow chart of a wireless automation test method for mobile device according to the present invention.

EMBODIMENTS

Detailed Description of the Embodiments

Hereunder some preferred embodiments of the present invention will be described, with reference to the accompanying drawings. It should be appreciated that the embodiments described here are only provided to describe and interpret the present invention, but don't constitute any limitation to the present invention.

FIG. 1 is a functional block diagram of a wireless automation test apparatus for mobile device according to the present invention. As shown in FIG. 1, the wireless automation test apparatus for mobile device of the present invention comprises: a user setting unit 101, a test management and control unit 102, a test execution unit 103, a test result processing unit 104, a display unit 105, and a communication interface unit 106, wherein, The user setting unit 101 is designed to receive user-defined settings, including user-defined setting of a cycle count for the whole round of test, user-defined setting of a test case schedule list, and user-defined setting of server IP for data synchronization, wherein, the synchronous data comprises a test case, a test configuration file, and an index file downloaded from a server and a test result uploaded to the server.

The test management and control unit 102 controls the communication interface unit 106 to download a test case, a configuration file, and an index file from a server (not shown in drawing) according to the user-defined settings received by the user setting unit 101; starts the test execution unit 103 to execute the test case, tracks and collects the test case execution state in real time, and sends the test process information to a display unit 105 for synchronous display; uploads collected on-site log and packed test result to the server via the communication interface unit 106.

In the present invention, a test developing engineer designs relevant test cases and prepares test case programs according to the application type of the mobile device to be tested, and creates a configuration file (containing relevant parameters, such as test objective and method, and test operation duration, etc.) and an index file (the index file is used to define the execution order of test case) for each test case. The test case program and the corresponding configuration file and index file are submitted to the server and are managed centrally by the server.

The test execution unit 103 accepts the control of the test management and control unit 102 and executes automatic operation of test case according to the user-defined setting mode received by the user setting unit 101.

In the present invention, the test execution unit 103 can execute automatic operation of a test case in two modes: Robot mode, in which fully automatic test can be executed in a loop, and the user can define a cycle count for the whole round of test; and, Human mode, in which a user-defined test case schedule list can be executed, and the current schedule list can be saved as a default test schedule list for fully automatic test, or a test case schedule list saved before can be selected. The test execution unit 103 reads the current test schedule list, locates the corresponding test case configuration file according to the order in the list, search for a test case program in a test case library by the name of test case program indicated in the configuration file, installs the test case program after successful search, and then starts test execution according to the invocation of test parameters in the configuration file. The test execution unit 103 starts a test case program, and executes the test, while the test management and control unit 102 monitors the state of the whole test, and the status information of test process is displayed on the interface of the display unit 105 synchronously.

The test result processing unit 104 accepts the control of the test management and control unit 102, collects on-site log, and packs test result. In case the execution of a test case fails in the test process, the display unit 105 will display error information, the test result processing unit 104 will immediately collect and pack the test result and relevant log that involve the error, notify the test management and control unit 102, and upload the packed test result and log that involve the error to the server through a wireless network.

The display unit 105 is designed to display test process information and error information synchronously. In the present invention, the display unit 105 can be a display screen of a mobile device.

The communication interface unit 106 employs a wireless network interface and is designed to transmit data between the test apparatus and the server. In the present invention, the communication interface unit 106 employs a wireless communication interface module, such as a RF communication module or WIFI communication module in a mobile device.

FIG. 2 is a flow chart of a wireless automation test method for mobile device according to the present invention. Hereunder the wireless automation test method for mobile device in the present invention will be detailed, with reference to FIG. 2.

First, in step 201, a test developing engineer designs relevant test cases and prepares test case programs according to the application type of the mobile device to be tested, and creates a configuration file (containing relevant parameters, such as test objective and method, and test operation duration, etc.) and an index file (the index file is used to define the execution order of test case) for each test case; the test case program and corresponding configuration file and index file are submitted to a server and are managed centrally by the server;

In step 202, the user setting unit 101 receives user-defined settings and confirms the IP of the synchronization server; the test management and control unit 102 downloads a test case and corresponding configuration file and index file from the server via the communication interface unit 106, according to the IP of synchronization server;

In step 203, the user setting unit 101 receives a user-defined test operation mode, and sends the operation mode information to the test management and control unit 102. In Robot mode, fully automatic test can be executed in a cyclic manner, and the user can define a cycle count for the whole round of test, and here, the operation mode information is the user-defined cycle count for the whole round of test; in Human mode, a user-defined test case schedule list can be executed, and the current schedule list can be saved as a default test schedule list for fully automatic test, or a test case schedule saved before can be selected, and here, the operation mode information is the user-defined test case schedule list. The test management and control unit 102 controls the test execution unit 103 to execute test cases according to the operation mode information;

In step 204, the display unit 105 displays test process information and error information synchronously;

In step 205, the test result is analyzed, packed, and uploaded together with collected on-site log to the server via the communication interface unit 106; in the test process, if the execution of a test case fails, the test result and relevant log that involve the error will be collected and packed immediately, the test management and control unit 102 will be notified, and the test result and log that involve the error will be uploaded to the server via the communication interface unit 106.

In step 206, the server presents the test result and error log; the server receives data, filters error information according to the type of collected log, and creates an index for the error log; the analyzed test case execution result and error log are displayed on a Web interface, so that the developer can ascertain the problem conveniently and the entire test process can be executed automatically.

The method provided in the present invention is easy to operate, and the test cost and the requirements for the skills of the tester can be reduced greatly. Hence, the user can complete the whole test process at anytime and anyplace, and can check a detailed and clear test report, whether the user is a technician or not. In Human mode, a product bug occurred in the test process can be reproduced conveniently, so that the software engineer can handle the reproduced problem more quickly. Since the present invention supports different test cases, a test engineer can complete different tests according to the test requirements.

The person skilled in the art should appreciate: the embodiments described above are only some preferred embodiments of the present invention, and does not intend to limit the present invention. Though the present invention is described and illustrated in detail with reference to the above-mentioned embodiments, the person skilled in the art can easily make modifications to the technical scheme described above in the embodiments or make equivalent replacement for some technical features. However, any modification, equivalent replacement, or refinement to the embodiments without departing from the spirit and principle of the present invention shall be deemed as falling into the protection scope of the present invention.

The invention claimed is:

1. A wireless automation test apparatus for mobile device, comprising:
  a user setting unit, a test management and control unit, a test execution unit, and a test result processing unit housed on the test apparatus, and a communication interface unit housed on a server, wherein,
  the user setting unit is designed to receive a user-defined cycle count for a whole round of test, a test case schedule list, and a server IP for data synchronization;
  the test management and control unit is designed to control the test operation of the test execution unit, control the test result processing unit to collect on-site log and pack the test result, and control the communication interface unit to send/receive information;
  the test execution unit is designed to control of the test management and control unit and to execute the test cases without a debugging cable;
  the test result processing unit is designed to control of the test management and control unit, to collects on-site log, and to analyze the test result; and
  the communication interface unit is designed to transmit synchronous data between the test apparatus and the server,
  wherein the tests and test results are executed, controlled and analyzed automatically without manual intervention.

2. The wireless automation test apparatus for mobile device according to claim 1, wherein, the test apparatus further comprises a display unit designed to display test process information and error information synchronously.

3. The wireless automation test apparatus for mobile device according to claim 2, wherein, the display unit is a display screen of a mobile device.

4. The wireless automation test apparatus for mobile device according to claim 3, wherein, the communication interface unit is a wireless communication interface module.

5. The wireless automation test apparatus for mobile device according to claim 2, wherein, the communication interface unit is a wireless communication interface module.

6. The wireless automation test apparatus for mobile device according to claim 1, wherein, the communication interface unit is a wireless communication interface module.

7. A wireless automation test method for mobile device, comprising the following steps:
  1) downloading a test case as well as a configuration file and an index file corresponding to the test case to a test management and control unit located on a test apparatus from a server;
  2) receiving a user-defined test operation mode and executing the test case according to the operation mode information;
  3) collecting on-site log, packing test result, and uploading the packed test result to the server; and
  4) presenting the test result and error log on a Web interface after the test result is analyzed by the server,
  wherein the tests and test results are executed, collected and analyzed automatically without bugging cable and without manual intervention.

8. The wireless automation test method for mobile device according to claim 7, wherein, the step 1) further comprises the following steps:
  a) user submitting a prepared test case, a configuration file and an index file created for the case to the server;
  b) obtaining a server IP for data synchronization;
  c) downloading the test case as well as the configuration file and index file corresponding to test case from the server.

9. The wireless automation test method for mobile device according to claim 7, wherein, the operation mode information in step 2) is a cycle count for the whole round of test or a test case schedule list.

10. The wireless automation test method for mobile device according to claim 7, wherein, the step 3) further comprises: in case an error occurs in the test case, immediately collecting and packing the test result and on-site log that involve the error, and uploading them to the server through a wireless network.

* * * * *